US012558850B2

(12) United States Patent
Ogihara

(10) Patent No.: US 12,558,850 B2
(45) Date of Patent: Feb. 24, 2026

(54) THREE DIMENSIONAL MOLDING DEVICE

(71) Applicant: SEIKO EPSON CORPORATION, Tokyo (JP)

(72) Inventor: Masaaki Ogihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 18/755,434

(22) Filed: Jun. 26, 2024

(65) Prior Publication Data

US 2025/0001699 A1    Jan. 2, 2025

(30) Foreign Application Priority Data

Jun. 29, 2023    (JP) .................................. 2023-106627

(51) Int. Cl.
| | |
|---|---|
| *B29C 64/393* | (2017.01) |
| *B29C 64/241* | (2017.01) |
| *B33Y 30/00* | (2015.01) |
| *B33Y 50/02* | (2015.01) |
| *B29K 23/00* | (2006.01) |

(Continued)

(52) U.S. Cl.
CPC .......... B29C 64/393 (2017.08); B29C 64/241 (2017.08); B33Y 30/00 (2014.12); B33Y 50/02 (2014.12); *B29K 2023/12* (2013.01); *B29K 2055/02* (2013.01); *B29K 2071/00* (2013.01)

(58) Field of Classification Search
None
See application file for complete search history.

(56) References Cited

U.S. PATENT DOCUMENTS

| | | |
|---|---|---|
| 2019/0061243 A1 | 2/2019 | Saito |
| 2020/0164586 A1 | 5/2020 | Yuwaki |

(Continued)

FOREIGN PATENT DOCUMENTS

| | | |
|---|---|---|
| JP | 2019-081263 A | 5/2019 |
| JP | 2021-006375 A | 1/2021 |
| JP | 2023-015046 A | 1/2023 |

*Primary Examiner* — Yung-Sheng M Tsui
(74) *Attorney, Agent, or Firm* — WORKMAN NYDEGGER

(57) ABSTRACT

The three dimensional molding device includes a plasticization section that has a screw and that generates a plasticized material, a nozzle that has nozzle opening and that ejects the plasticized material, an ejection rate adjustment mechanism that communicates with the nozzle opening, the ejection rate adjustment mechanism controlling the ejection rate of the plasticized material from the nozzle opening by adjusting an opening degree of a flow path, and a control section, wherein the control section executes at least one of a first control for changing the rotation speed of the screw in multi-stages during an ejection stopped period, which is a period after ejection of the plasticized material from the nozzle opening is stopped and before ejection of the plasticized material from the nozzle opening is resumed, and a second control for changing the rotation speed of the screw in multi-stages during a resume ejection period, which is a period after ejection of the plasticized material from the nozzle opening is resumed and before the opening degree of the flow path reaches an opening degree designated for the ejection rate adjustment mechanism and in the second control, the control section decreases and then increases the rotation speed of the screw.

5 Claims, 18 Drawing Sheets

(51) Int. Cl.
    *B29K 55/02*          (2006.01)
    *B29K 71/00*          (2006.01)

(56)                    References Cited

U.S. PATENT DOCUMENTS

2020/0406531 A1*  12/2020  Hashimoto  ........... B29C 64/209
2024/0253309 A1*   8/2024  Karklinsh  ............. B33Y 30/00

* cited by examiner

THREE DIMENSIONAL MOLDING DEVICE

The present application is based on, and claims priority from JP Application Serial Number 2023-106627, filed Jun. 29, 2023, the disclosure of which is hereby incorporated by reference herein in its entirety.

BACKGROUND

1. Technical Field

The present disclosure relates to a three dimensional molding device.

2. Related Art

JP-A 2019-81263 discloses a three dimensional molding device including a flow rate adjustment mechanism capable of controlling the amount of a molten material ejected from a nozzle. The three dimensional molding device disclosed in JP-A 2019-81263 can adjust the amount of ejection from the nozzle by adjusting the rotation angle of a butterfly valve as a flow rate adjustment mechanism. However, during the period from ejection is stopped to when ejection is resumed, the pressure in the flow path upstream of the butterfly valve may not be stable, and the ejection amount when resuming ejection or immediately after resuming ejection may not be stable.

SUMMARY

According to a first aspect of the present disclosure, a three dimensional molding device is provided. The three dimensional molding device includes a plasticization section that includes a screw and a motor configured to rotate the screw and that plasticizes a material to generate a plasticized material; a nozzle that has nozzle opening and that ejects the plasticized material; an ejection rate adjustment mechanism provided in a flow path through which the plasticized material flows and that communicates with the nozzle opening, the ejection rate adjustment mechanism controlling the ejection rate of the plasticized material from the nozzle opening by adjusting an opening degree of the flow path; and a control section configured to control the plasticization section and the ejection rate adjustment mechanism, wherein the control section executes at least one of a first control for changing the rotation speed of the screw in multi-stages during an ejection stopped period, which is a period after ejection of the plasticized material from the nozzle opening is stopped and before ejection of the plasticized material from the nozzle opening is resumed, and a second control for changing the rotation speed of the screw in multi-stages during a resume ejection period, which is a period after ejection of the plasticized material from the nozzle opening is resumed and before the opening degree of the flow path reaches an opening degree designated for the ejection rate adjustment mechanism and in the second control, the control section decreases and then increases the rotation speed of the screw.

DESCRIPTION OF EMBODIMENTS

A. First Embodiment

Figure 1:
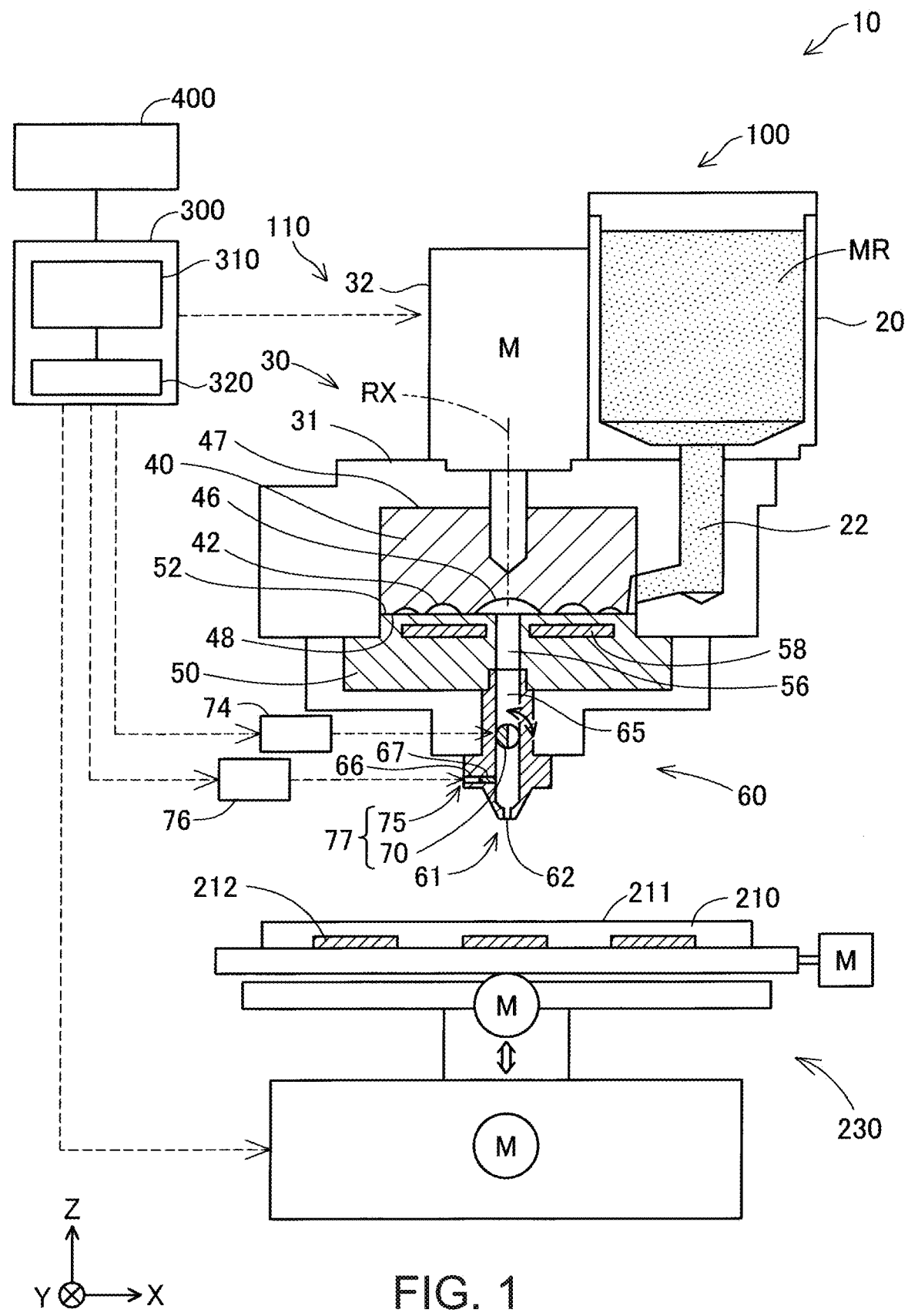
FIG. 1 is an explanatory diagram illustrating a schematic configuration of a three dimensional molding system.

FIG. 1 is an explanatory diagram showing a schematic configuration of a three dimensional molding system 10 according to the first embodiment. In FIG. 1, arrows indicating X, Y, and Z directions orthogonal to each other are shown. The X direction and the Y direction are directions parallel to a horizontal plane, and the Z direction is a direction along a vertically upward direction. The arrows indicating the X, Y, and Z directions are appropriately illustrated in other drawings so that the illustrated directions correspond to those in FIG. 1. In the following description, when a direction is specified, a direction indicated by an arrow in each drawing is referred to as "+" and an opposite direction is referred to as "−", and positive and negative signs are used in combination for direction notation. Hereinafter, the +Z direction is also referred to as "upper", and the −Z direction is also referred to as "lower".

The three dimensional molding system 10 includes a three dimensional molding device 100 and an information processing device 400. The three dimensional molding device 100 of the present embodiment is a device that shapes a molded object by a material extrusion method. The three dimensional molding device 100 includes a control section 300 for controlling each unit of the three dimensional molding device 100. The control section 300 and the information processing device 400 are communicably coupled to each other.

The three dimensional molding device 100 includes a head section 110 that generates and ejects a plasticized material, a stage 210 that serves as a base of the molded object, and a moving mechanism 230 that controls an ejection position of the plasticized material.

Under the control of the control section 300, the head section 110 ejects plasticized material, which was material in a solid state that was plasticized, onto the stage 210. The head section 110 includes a material feeder 20, that is, a supply source of a raw material before being converted into a plasticized material, a plasticization section 30 that converts the raw material into the plasticized material, and an ejection section 60 that ejects the plasticized material.

The material feeder 20 supplies the raw material MR to the plasticization section 30. The material feeder 20 is constituted by, for example, a hopper that accommodates the raw material MR. The material feeder 20 is coupled to the plasticization section 30 via a passageway 22. The raw material MR is introduced into the material feeder 20 in the form of pellets, powder, or the like. As the raw material MR, for example, a resin material such as acrylonitrile butadiene styrene (ABS), polyether ether ketone (PEEK), or polypropylene (PP) is used.

The plasticization section 30 plasticizes the raw material MR supplied from the material feeder 20 to generate a pasty plasticized material exhibiting fluidity, and guides the plasticized material to the ejection section 60. In the present embodiment, "plasticization" is a concept that includes melting and is a change from a solid to a state having fluidity. Specifically, in the case of a material in which glass transition occurs, plasticization means that the temperature of the material is set to be equal to or higher than the glass transition point. In the case of a material in which glass transition does not occur, plasticization refers to raising the temperature of the material above its melting point.

The plasticization section 30 includes a screw case 31, a drive motor 32, a screw 40, and a barrel 50. The screw 40 is also referred to as a flat screw, a rotor, or a scroll. The barrel 50 is also called a screw facing portion.

The screw 40 is housed in the screw case 31. A top surface 47 of the screw 40 is coupled to the drive motor 32, and the screw 40 is rotated in the screw case 31 by a rotational driving force generated by the drive motor 32. The drive motor 32 is driven under the control of the control section 300. Note that the screw 40 may be driven by the drive motor 32 via a reduction gear.

Figure 2:
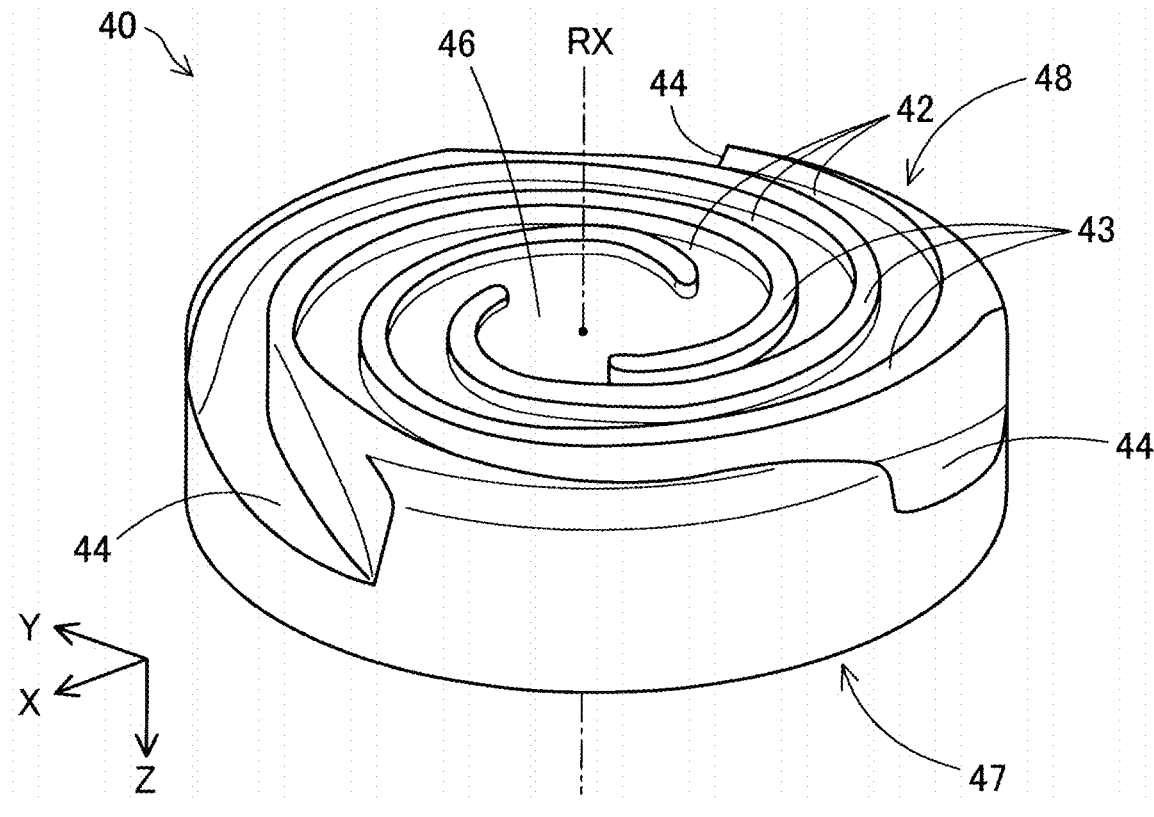
FIG. 2 is a perspective view showing a schematic configuration of a screw.

FIG. 2 is a perspective view showing a schematic configuration of a bottom surface 48 of the screw 40. In order to facilitate technical understanding, the screw 40 shown in FIG. 2 is shown in a state in which the positional relationship between the top surface 47 and the bottom surface 48 shown in FIG. 1 is reversed in the vertical direction. The screw 40 has a substantially cylindrical shape with a length in its axial direction, which is a direction along a central axis thereof, smaller than its length in a direction vertical to the axial direction. The screw 40 is arranged such that the central axis RX, which is its center of rotation, is parallel to the Z direction.

A vortex groove portion 42 is formed in the bottom surface 48 of the screw 40, which intersects the rotation axis RX. The passageway 22 of the material feeder 20 described above communicates with the groove portion 42 from the side surface of the screw 40. In the present embodiment, three groove portions 42 are formed separated from each other by a ridge portion 43. Note that the number of groove portions 42 is not limited to three, and may be one or two or more. The groove portion 42 is not limited to a vortex shape, but may be a spiral shape or an involute curve shape, or may be a shape extending so as to draw an arc from the central portion toward the outer periphery.

As shown in FIG. 1, the bottom surface 48 of the screw 40 faces a top surface 52 of the barrel 50, and a gap is formed between the groove portion 42 of the bottom surface 48 of the screw 40 and the top surface 52 of the barrel 50. The raw material MR is supplied from the material feeder 20 to the gap between the screw 40 and the barrel 50 through a material inlet 44 shown in FIG. 2.

A barrel heater 58 for heating the raw material MR supplied into the groove portion 42 of the rotating screw 40 is embedded in the barrel 50. A communication hole 56 is provided at the center of the barrel 50.

Figure 3:
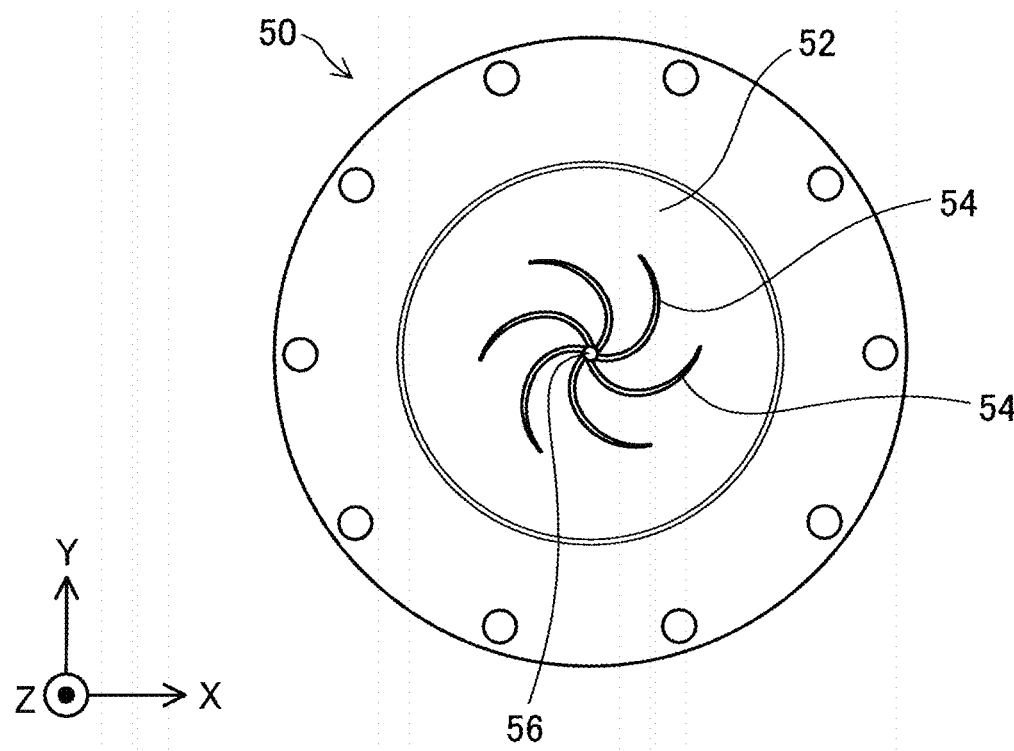
FIG. 3 is a schematic plan view of a barrel.

FIG. 3 is a schematic plan view showing the top surface 52 of the barrel 50. A plurality of guide grooves 54 that are vortex grooves extending from the communication hole 56 toward the outer periphery, coupled to the communication hole 56 and are formed on the top surface 52 of the barrel 50. Note that one end of the guide grooves 54 may not be coupled to the communication hole 56. The guide groove 54 may be omitted.

The raw material MR supplied into the groove portion 42 of the screw 40 flows along the groove portion 42 by the rotation of the screw 40 while being melted in the groove portion 42, and is guided to a central portion 46 of the screw 40 as a plasticized material. The pasty plasticized material exhibiting fluidity, which has flowed into the central portion 46, is supplied to the ejection section 60 via the communication hole 56 provided at the center of the barrel 50. Note that in the plasticized material, all the substances constituting the plasticized material may not be plasticized. The plasticized material may be converted into a state having fluidity as a whole by plasticizing at least some kinds of substances among substances constituting the plasticized material.

The ejection section 60 in FIG. 1 includes a nozzle 61 that ejects the plasticized material, a flow path 65 of the plasticized material provided between the screw 40 and a nozzle opening 62, and an ejection control section 77 that controls ejection of the plasticized material.

The nozzle 61 is coupled to the communication hole 56 of the barrel 50 via the flow path 65. The nozzle 61 ejects the plasticized material that was generated in the plasticization section 30 from the nozzle opening 62 in the tip of the nozzle 61 toward the stage 210.

The ejection control section 77 includes an ejection rate adjustment mechanism 70 that opens and closes the flow path 65, and a suction mechanism 75 that sucks out and temporarily holds the plasticized material.

The ejection rate adjustment mechanism 70 is provided in the flow path 65 and changes the opening degree of the flow path 65 by rotating in the flow path 65. In the present embodiment, the ejection rate adjustment mechanism 70 is constituted by a valve. The ejection rate adjustment mechanism 70 is driven by a first driving section 74 under the control of the control section 300. The first driving section 74 is configured by, for example, a stepping motor. The control section 300 can adjust the flow rate of the plasticized material flowing from the plasticization section 30 to the nozzle 61, that is, the amount of the plasticized material ejected from the nozzle 61, by controlling the rotation angle of the valve using the first driving section 74. The ejection rate adjustment mechanism 70 can adjust the ejection amount of the plasticized material and can control the ON/OFF of the plasticized material's outflow.

The suction mechanism 75 includes a branch path 66 coupled to the flow path 65 and a plunger 67 located in the branch path 66. The branch path 66 is coupled to the flow path 65 between the ejection rate adjustment mechanism 70 and the nozzle opening 62. Hereinafter, moving the plunger 67 away from the flow path 65 in the branch path 66 is referred to as "pulling the plunger 67", and moving the plunger 67 closer to the flow path 65 is referred to as "pushing the plunger 67". The plunger 67 of the suction mechanism 75 is driven by a second driving section 76 under the control of the control section 300. The second driving section 76 is configured by, for example, a stepping motor, a rack and pinion mechanism that converts rotational force of the stepping motor into a translational motion of the plunger 67, or the like.

The control section 300 controls the suction mechanism 75 to temporarily suck the plasticized material in the flow path 65 into the branch path 66 by pulling the plunger 67 when ejection of the plasticized material from the nozzle 61 is stopped. By doing so, it is possible to suppress a tailing phenomenon in which the plasticized material drips from the nozzle opening 62 in a string-like manner. At the time of resuming ejection of the plasticized material from the nozzle 61, the control section 300 sucks the plasticized material from the flow path 65 by pulling the plunger 67 or feeds the plasticized material into the flow path 65 by pushing the plunger 67, thereby adjusting the ejection amount of the plasticized material fed from the nozzle 61 to be constant. This makes it possible to keep the line width of the plasticized material constant at the time of resuming ejection.

The stage 210 is disposed at a position facing the nozzle opening 62 of the nozzle 61. In the first embodiment, a molding stage 211 of the stage 210 facing the nozzle opening 62 of the nozzle 61 is arranged to be parallel to the X and Y directions, that is, the horizontal direction. The stage 210 is provided with a stage heater 212 for suppressing rapid cooling of the plasticized material ejected onto the stage 210. The stage heater 212 is controlled by the control section 300.

The moving mechanism 230 changes the relative position between the stage 210 and the nozzle 61 under the control of the control section 300. In this embodiment, the position of the nozzle 61 is fixed, and the moving mechanism 230 moves the stage 210. The moving mechanism 230 is configured by a three axis positioner that moves the stage 210 in three axis directions of X, Y, and Z directions by the driving forces of three motors. In this specification, unless otherwise specified, the movement of the nozzle 61 means that the nozzle 61 or the ejection section 60 is relatively moved with respect to the stage 210.

Note that in another embodiment, instead of the configuration in which the stage 210 is moved by the moving mechanism 230, a configuration may be employed in which the position of the stage 210 is fixed and the moving mechanism 230 moves the nozzle 61 with respect to the stage 210. A configuration may be employed in which the stage 210 is moved in the Z direction by the moving mechanism 230 and the nozzle 61 is moved in the X and Y directions, or in which the stage 210 is moved in the X and Y directions by the moving mechanism 230 and the nozzle 61 are moved in the Z direction. Even in these configurations, the relative positional relationship between the nozzle 61 and the stage 210 can be changed.

Although only one head section 110 is shown in FIG. 1, the three dimensional molding device 100 may include a plurality of head sections 110. By providing a plurality of head sections 110, a different type of plasticized material can be ejected from each head section 110. Therefore, for example, the main body of the shaped object and the support structure that supports the molded object can be shaped with different types of plasticized materials.

The control section 300 is a control device that controls operation of the entire three dimensional molding device 100. The control section 300 is configured by a computer including one or a plurality of processors 310, a storage device 320 including a main memory and an auxiliary storage, and an input and output interface that performs the input and output of signals with the outside. By executing the program stored in the storage device 320, the processor 310 controls the plasticization section 30 and the moving mechanism 230 in accordance with the molding data acquired from the information processing device 400 to shape the molded object on the stage 210. Note that the control section 300 may be realized by a configuration in which circuits are combined instead of a computer.

Figure 4:
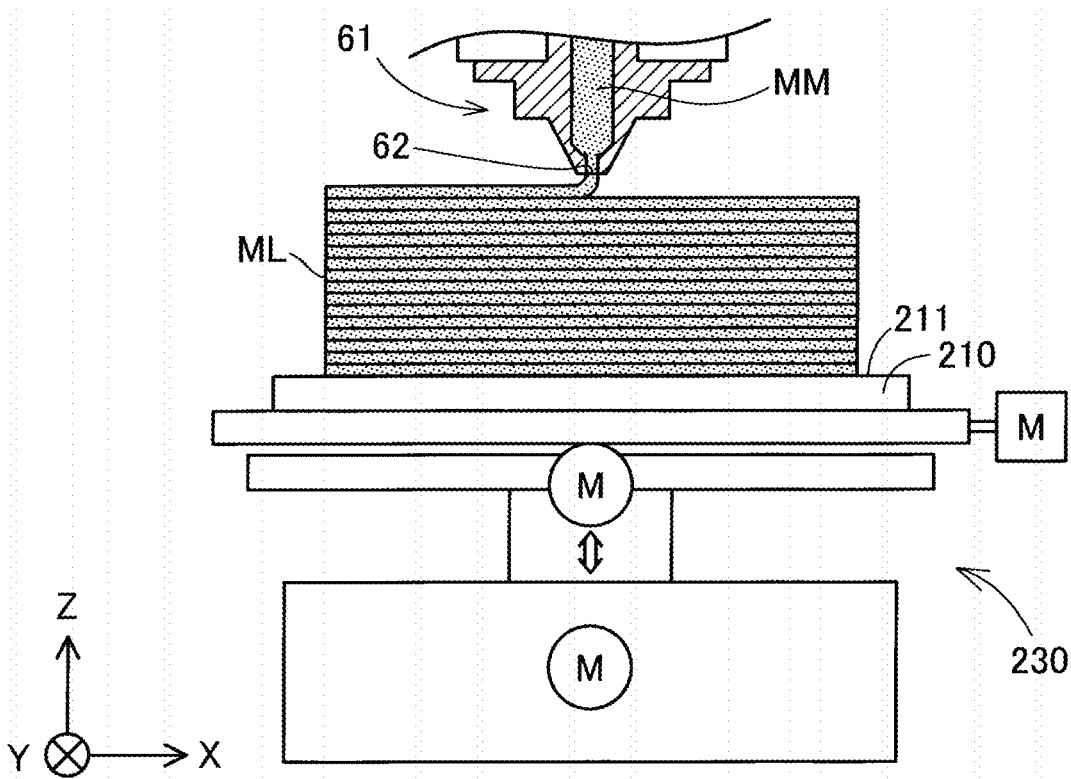
FIG. 4 is an explanatory diagram schematically illustrating a state in which a three dimensional molding device shapes a molded object.

FIG. 4 is an explanatory view schematically showing a state in which the three dimensional molding device 100 shapes a molded object. In the three dimensional molding device 100, as described above, the raw material MR, which is in a solid state, is plasticized to generate the plasticized material MM. The control section 300 causes the nozzle 61 to eject plasticized material MM while changing the position of the nozzle 61 with respect to the stage 210 in a direction along the molding stage 211 of the stage 210 while maintaining the distance between the molding stage 211 of the stage 210 and the nozzle 61. The plasticized material MM ejected from the nozzle 61 is continuously ejected in the moving direction of the nozzle 61.

The control section 300 forms a layer ML by repeating the movement of the nozzle 61. After forming one layer ML, the control section 300 relatively moves the position of the nozzle 61 with respect to the stage 210 in the Z direction, which is the direction in which the layers are stacked. Then, the molded object is molded by further stacking layers ML on the layers ML formed previously.

For example, the control section 300 may temporarily interrupt the movement of the nozzle 61 in the Z direction when the layer ML for one layer is completed, or may temporarily interrupt ejection of the plasticized material from the nozzle 61 when there are a plurality of independent shaping regions in each layer. In this case, for example, the control section 300 causes the ejection rate adjustment mechanism 70 to close the flow path 65 to stop ejection of the plasticized material MM from the nozzle opening 62, and causes the suction mechanism 75 to temporarily suck the plasticized material in the nozzle 61. For example, after changing the position of the nozzle 61, the control section 300 causes the ejection rate adjustment mechanism 70 to open the flow path 65 while ejecting the plasticized material in the suction mechanism 75, thereby resuming the deposition of the plasticized material MM from the changed position of the nozzle 61.

Figure 5:
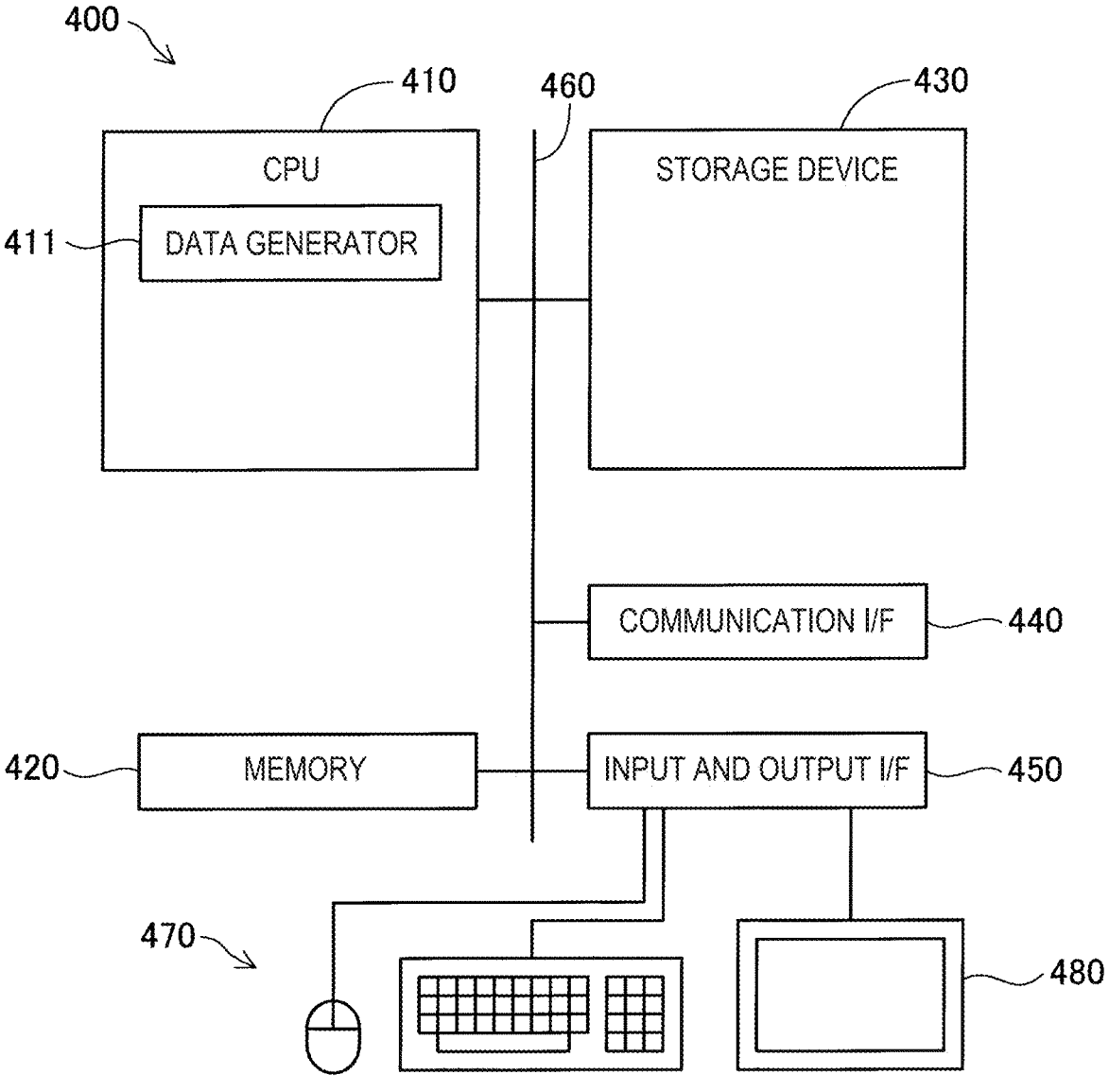
FIG. 5 is an explanatory diagram of a schematic configuration of an information processing device.

FIG. 5 is an explanatory diagram showing a schematic configuration of the information processing device 400. The information processing device 400 is configured as a computer in which a CPU 410, a memory 420, a storage 430, a communication interface 440, and an input and output interface 450 are coupled to each other by a bus 460. An input device 470 such as a keyboard or a mouse and a display 480 such as a liquid crystal display are coupled to the input and output interface 450. The information processing device 400 is coupled to the control section 300 of the three dimensional molding device 100 via the communication interface 440.

The CPU 410 functions as a data generator 411 by executing a program stored in the storage 430.

The data generator 411 generates molding data. The molding data represents information such as the travel path of the nozzle 61 relative to the stage 210, the amount of plasticized material ejected from the nozzle 61, the rotation speed of the screw 40, and the like. The data generator 411 reads geometrical data representing the shape of a three dimensional molded object created using a three dimensional CAD software or a three dimensional CG software and divides the shape of the three dimensional molded object into layers, each having a predetermined thickness. As the geometrical data, data in an STL format, an AMF format, or the like is used. The data generator 411 generates the molding data by determining the travel path of the nozzle 61 and the amount of the plasticized material required to fill each of the divided layers with the plasticized material. The molding data is represented by a G code, an M code, or the like.

Figure 6:
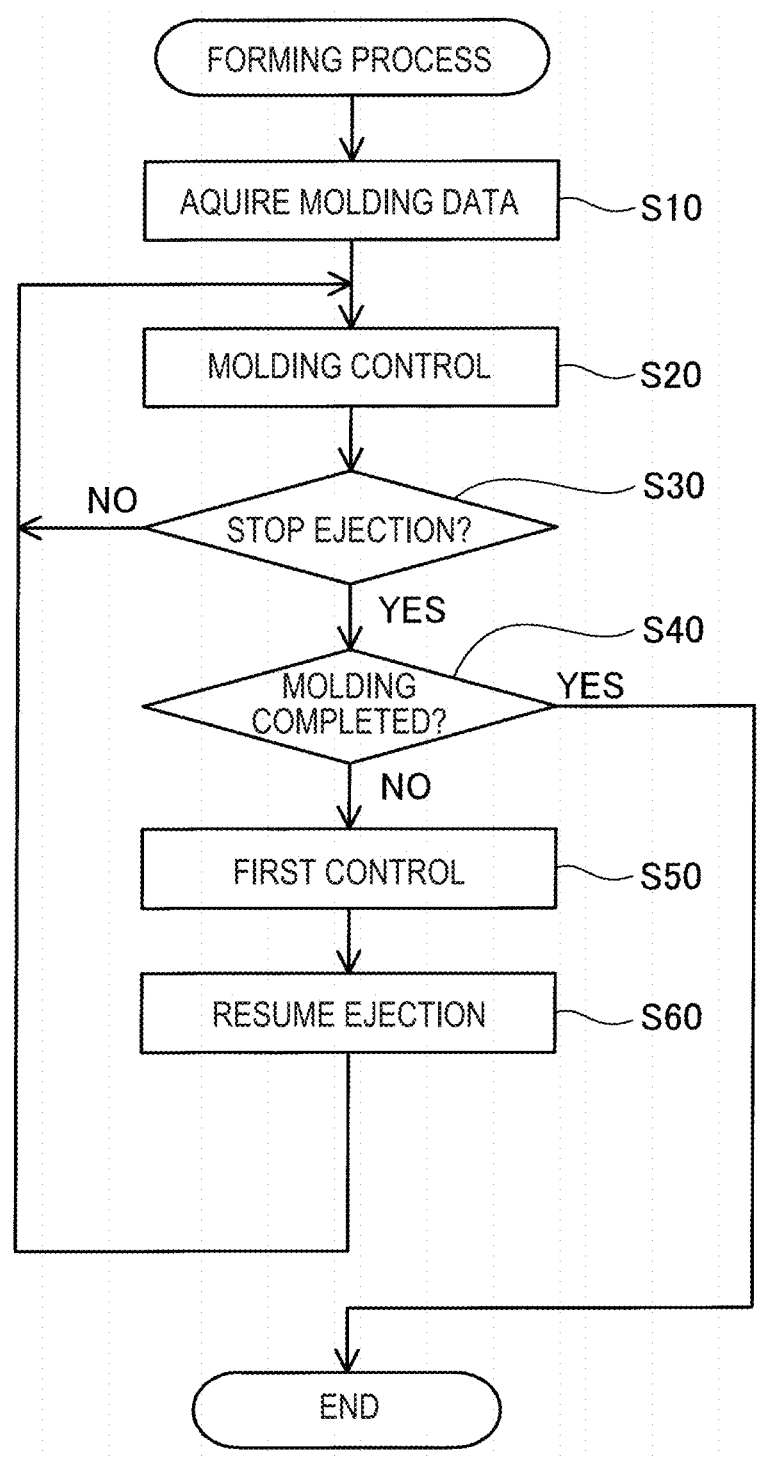
FIG. 6 is a flowchart of a forming process.

FIG. 6 is a flowchart of a forming process executed by the control section 300 of the three dimensional molding device 100. In step S10, the control section 300 acquires molding data generated by the information processing device 400.

In step S20, the control section 300 performs the molding control. In the molding control, the control section 300 controls the plasticization section 30 to start ejection of the plasticized material, and shapes the three dimensional molded object. The control section 300 controls the plasticization section 30, the ejection control section 77, and the moving mechanism 230 in accordance with the molding data, thereby shaping the three dimensional molded object on the stage 210 as shown in FIG. 4.

In step S30, the control section 300 determines whether or not to stop ejection of the plasticized material from the nozzle opening 62. In step S30, the control section 300 analyzes the molding data and determines to stop ejection of the plasticized material, for example, in a case corresponding to any one of the following A to D. When it is determined that ejection is not to be stopped, the control section 300 returns the process to step S20 and continues molding of the three dimensional molded object until it is determined that ejection is to be stopped.

A. Molding of all layers has been completed.
B. The nozzle 61 is moved along the Z direction in order to mold a different layer.
C. The nozzle 61 is moved to a different position in the same layer.
D. When the three dimensional molding device 100 includes the plurality of head sections 110, the use of the head section 110 is switched.

When it is determined in step S30 that ejection is to be stopped, the control section 300 determines in step S40 whether or not molding of all the layers has been completed. When it is determined that the shaping of all the layers has been completed, the control section 300 ends the forming process.

In step S40, in a case where it is not determined that the shaping of all the layers has been completed, the control section 300 executes the first control in step S50. The first control is a control in which the rotation speed of the screw 40 is changed in multi-stages during an ejection stopped period, which is the period after ejection of the plasticized material from the nozzle opening 62 is stopped and before ejection of the plasticized material from the nozzle opening 62 is resumed. "Changing the rotation speed of the screw 40 in multi-stages during an ejection stopped period" refers to changing the rotation speed of the screw 40 one or more times during the ejection stopped period.

Figure 7:
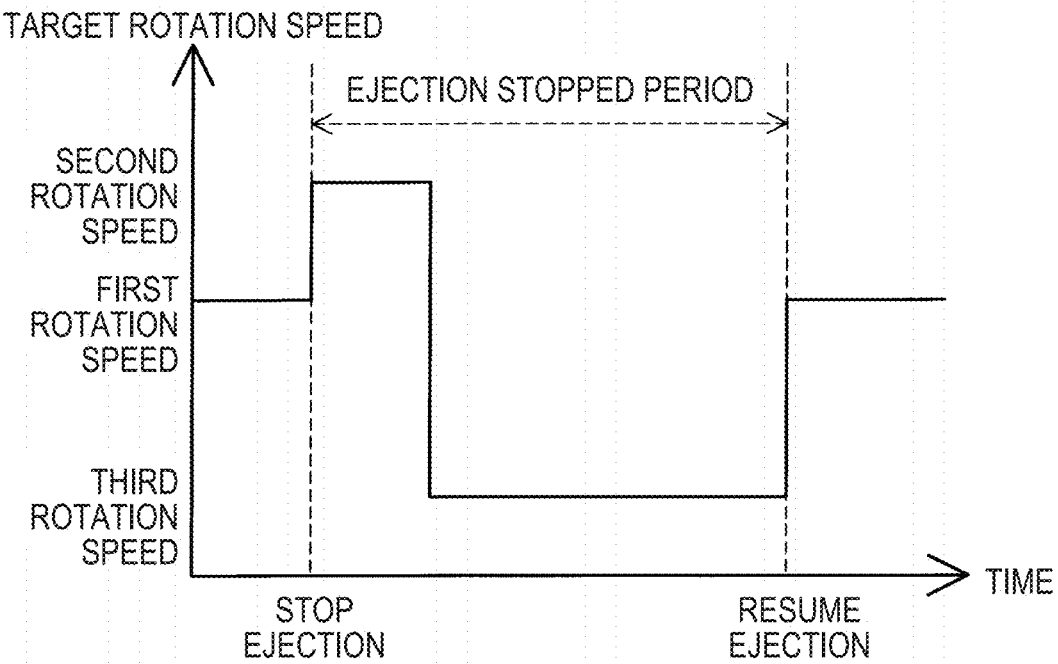
FIG. 7 is a timing chart showing processing contents of the first control.

FIG. 7 shows a timing chart, which is the processing content of the first control in the first embodiment. FIG. 7 shows a timing chart of a signal that is output from the control section 300 to the plasticization section 30 and that indicates the target rotation speed of the screw 40. In the first control, the control section 300 increases the rotation speed of the screw 40 to the second rotation speed, which is a rotation speed higher than a first rotation speed in the period before the ejection stopped period, and then decreases the rotation speed to a third rotation speed, which is a rotation speed lower than the first rotation speed. The first rotation speed is the rotation speed of the screw 40 during molding of the three dimensional molded object. The second rotation speed, the third rotation speed, and the duration time of the second rotation speed are determined in advance by performing simulations and experiments so that the pressures in the flow path 65 upstream of the ejection rate adjustment mechanism 70 become appropriate pressures when ejection is resumed. Hereinafter, the pressure in the flow path 65 upstream of the ejection rate adjustment mechanism 70 is referred to as the "internal pressure". The first rotation speed, the second rotation speed, the third rotation speed, and the duration time of each rotation speed may vary depending on the type of material used. The first rotation speed and the second rotation speed may be the same rotation speed.

After executing the first control, in step S60 shown in FIG. 6, the control section 300 controls the ejection rate adjustment mechanism 70 to resume ejection of the plasticized material from the nozzle opening 62. At this time, as shown in FIG. 7, the control section 300 increases the rotation speed of the screw 40 from the second rotation speed to return to the first rotation speed in the period before the ejection stopped period. Thereafter, the control section 300 returns the process to step S20 and continues molding the three dimensional molded object.

The three dimensional molding device 100 according to the first embodiment described above performs the first control of changing the rotation speed of the screw 40 in multi-stages during the ejection stopped period, which is the period after ejection of the plasticized material is stopped and before ejection of the plasticized material from the nozzle opening 62 is resumed. Therefore, at the time of resuming ejection, it is possible to quickly stabilize the internal pressure, which is the pressure in the flow path on upstream of the ejection rate adjustment mechanism 70, to an appropriate pressure. As a result, it is possible to stabilize the ejection amount at the time of resuming ejection and to keep the line width constant.

Hereinafter, experimental results related to the first control will be described with reference to FIGS. 8 to 12. In this experiment, an ABS resin was used as a material.

Figure 8:
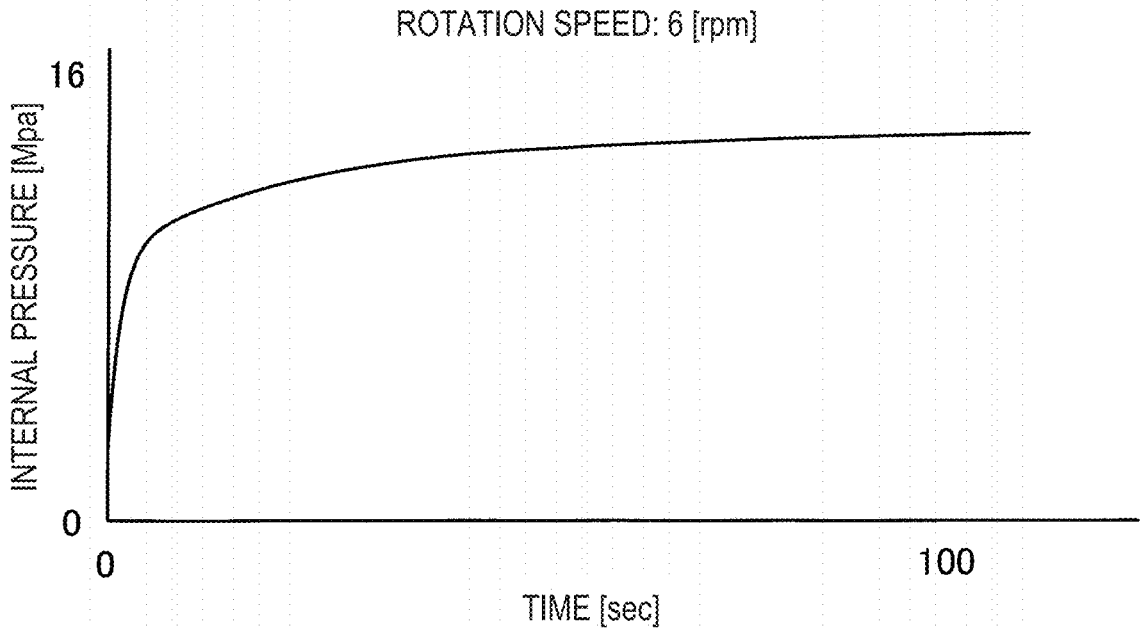
FIG. 8 is a first graph showing changes in internal pressure with time.
Figure 9:
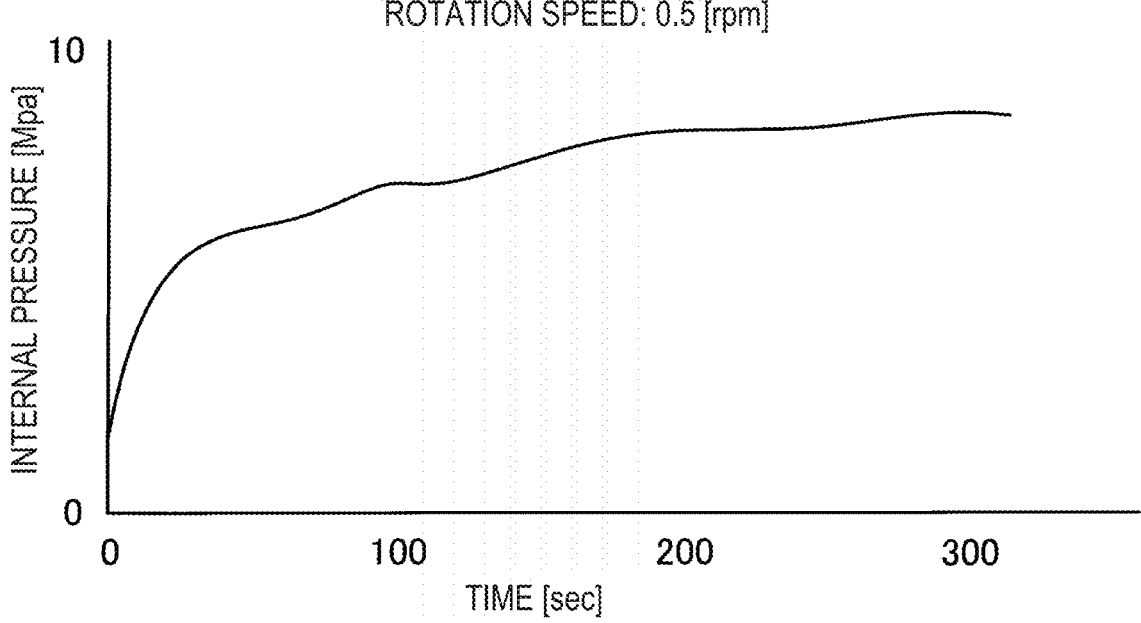
FIG. 9 is a second graph showing a change in internal pressure with time.

FIG. 8 is a graph showing a temporal change of the internal pressure when the rotation speed of the screw 40 is 6 rpm. FIG. 9 is a graph showing a temporal change in internal pressure when the rotation speed of the screw 40 is 0.5 rpm. In these figures, the horizontal axis represents the elapsed time from when ejection was stopped. The vertical axis represents the internal pressure of the flow path 65 upstream of the ejection rate adjustment mechanism 70. At the rotation speed shown in FIG. 8, the internal pressure after ejection is stopped becomes excessive with respect to the internal pressure at the time when ejection was stopped, the ejection amount of the plasticized material greatly increases at the time of resuming ejection, and it becomes difficult to keep the line width constant. In contrast, at the rotation speed shown in FIG. 9, it is possible to suppress the internal pressure from becoming excessive, but it takes time for the change in the internal pressure to stabilize. Therefore, when the ejection stopped period is short, the internal pressure becomes insufficient at the time of resuming ejection, and the ejection amount of the plasticized material may be insufficient.

Figure 10:
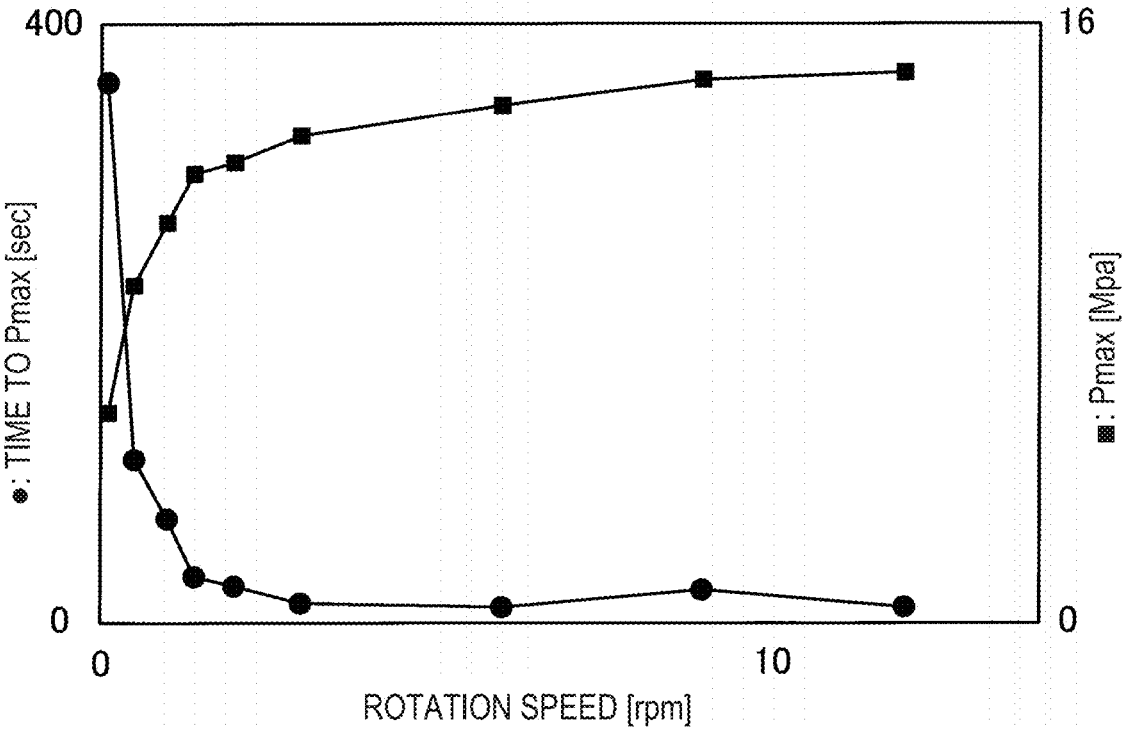
FIG. 10 is a graph showing the relationship between the maximum internal pressure and the time required to reach 80% of the maximum internal pressure at each rotation speed.

FIG. 10 is a graph showing the relationship between the maximum internal pressure Pmax and the time until the pressure reaches 80% of the maximum internal pressure Pmax at each rotation speed. The maximum internal pressure Pmax is the internal pressure when the pressure change becomes substantially zero because of the elapsed time from when ejection was stopped. According to the experimental results shown in FIG. 10, it was confirmed that even when the rotation speed was set to 1 rpm to 2 rpm to shorten the time until the internal pressures reached the maximum internal pressures Pmax, the maximum internal pressures Pmax exceeded the appropriate pressures. The appropriate pressure is, for example, a pressure that is 2 to 3 times the internal pressure at the time of molding and is a pressure at which the line width can be kept constant by operating the plunger 67 at the time of resuming ejection. According to the experimental results shown in FIGS. 8 to 10, it was confirmed that it is difficult to suppress the internal pressure from becoming excessive while shortening the time until the internal pressure becomes stable in the case of controlling the rotation speed of the screw 40 constant without changing the rotational speed during the ejection stopped period.

Figure 11:
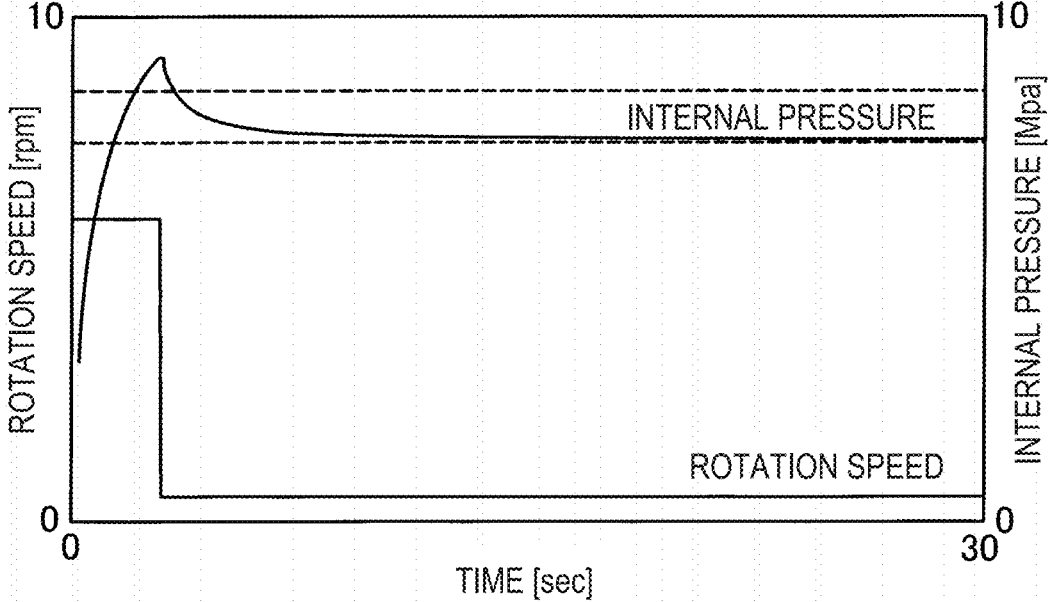
FIG. 11 is a graph showing a change in internal pressure when the rotation speed of the screw is changed stepwise.
Figure 12:
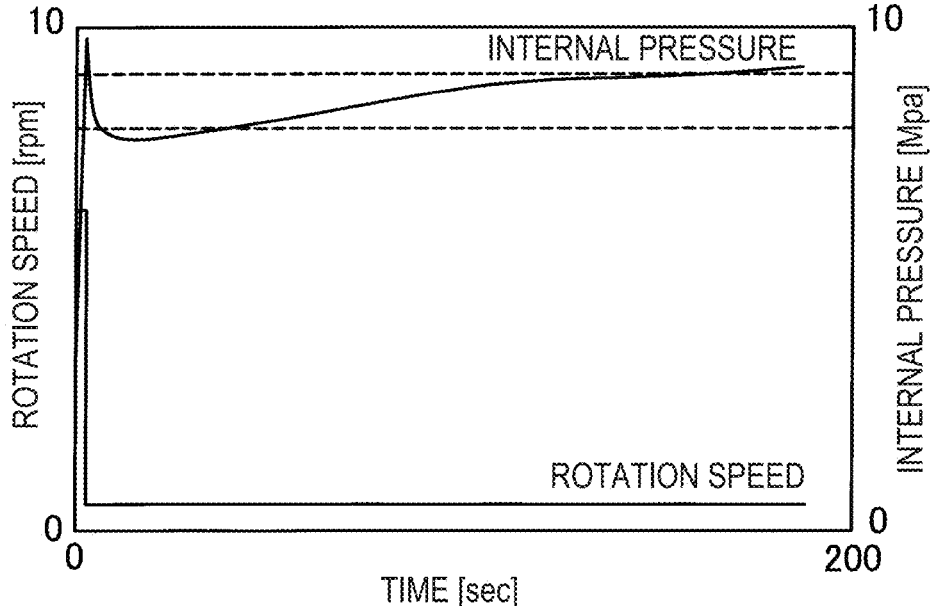
FIG. 12 is a graph obtained by extending the time axis of FIG. 11.

FIG. 11 is a graph showing the change in internal pressure when the rotation speed of the screw 40 is decreased from 6 rpm to 0.5 rpm when 0.3 seconds have elapsed after ejection is stopped. FIG. 12 is a graph in which the time axis of FIG. 11 is extended. As shown in FIGS. 11 and 12, when the rotation speed of the screw 40 is changed in multi-stages after ejection is stopped, the internal pressure can be immediately increased to the appropriate pressure range indicated by the broken line, and the pressure can be stabilized in a short time. In other words, it was confirmed that, by the control section 300 executing the first control, it is possible to shorten the time until the internal pressure becomes stable while suppressing the internal pressure from becoming excessive. Therefore, according to the first embodiment, it is possible to stabilize the ejection amount at the time of resuming ejection regardless of the length of the ejection stopped period.

B. Second Embodiment

The configuration of the three dimensional molding system 10 in the fourth embodiment is the same as that in the first embodiment. In the second embodiment, the content of the first control executed by the control section 300 in the forming process is different from that in the first embodiment.

Figure 13:
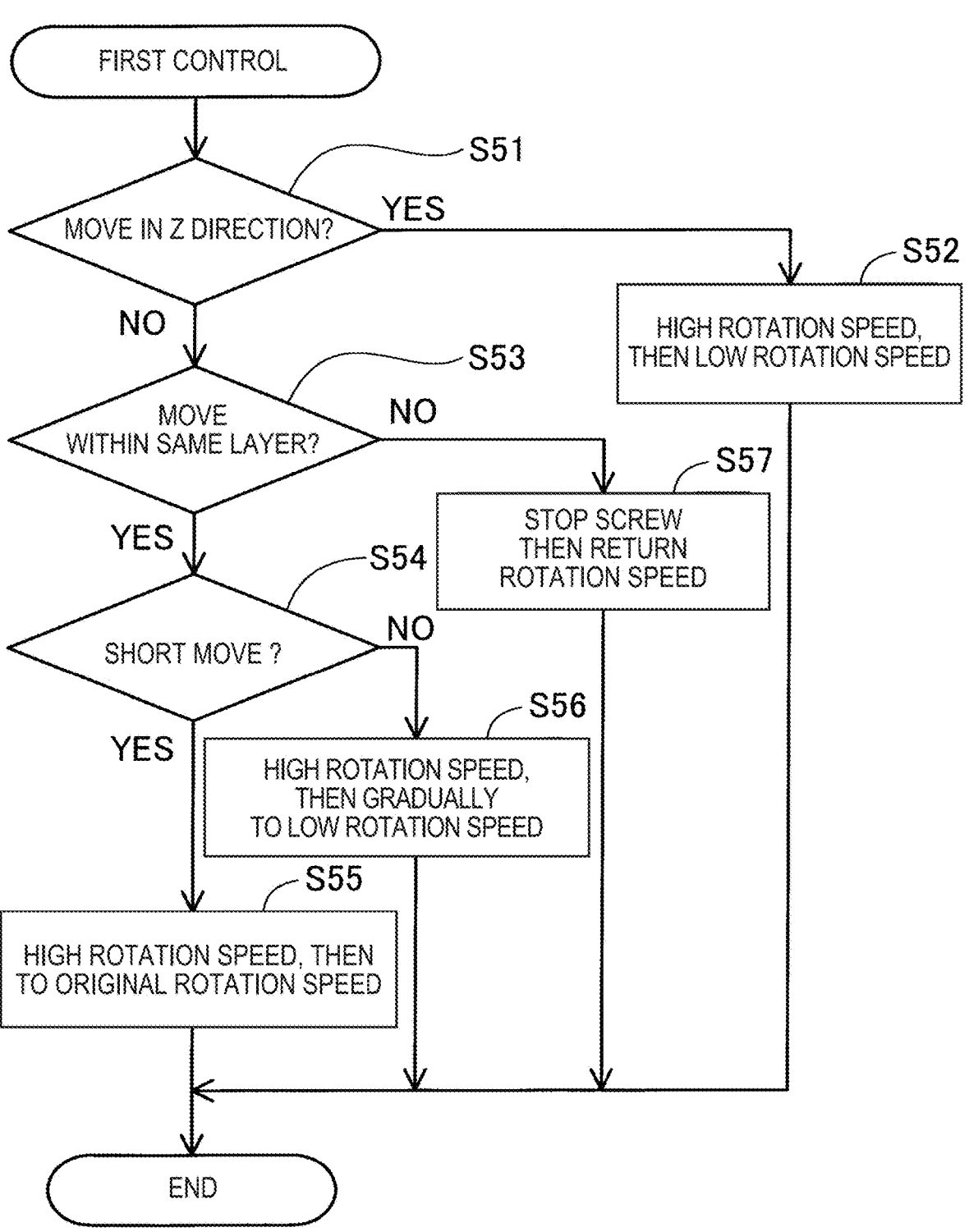
FIG. 13 is a detailed flowchart of the first control in the second embodiment.

FIG. 13 is a detailed flowchart of the first control executed by the control section 300 in the second embodiment. In step S51, the control section 300 determines whether or not the reason for stopping ejection is the above B, that is, for moving the nozzle 61 along the Z direction.

When it is determined in step S51 that ejection stopped because of the above B then, in step S52, the control section 300 increases the rotation speed of the screw 40 to the second rotation speed, which is a rotation speed higher than the first rotation speed, which was the rotation speed before the ejection stopped period, and then decreases the rotation speed to the third rotation speed, which is a rotation speed lower than the first rotation speed, and ends the first control. The control content in step S52 is the same as the first control in the first embodiment shown in FIG. 7.

When it is determined in step S51 that the reason for stopping ejection is not the above B, the control section 300 determines in step S53 whether or not the reason for stopping ejection is the above C, that is, for moving the nozzle 61 to a different position in the same layer.

When it is determined in step S53 that the reason for stopping ejection is the above C, the control section 300 determines in step S54 whether or not the movement distance of the nozzle 61 in the same layer is a distance shorter than a predetermined distance. When it is determined that the movement distance of the nozzle 61 is a distance shorter than the predetermined distance, the control section 300 executes step S55. The predetermined distance is, for example, 1 mm to 10 mm.

Figure 14:
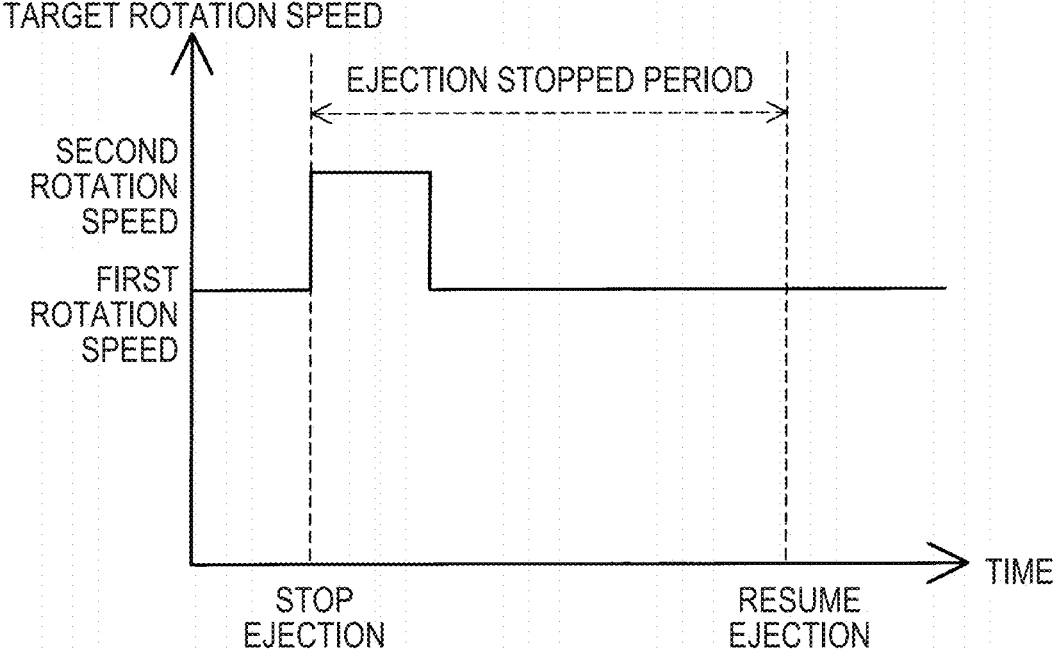
FIG. 14 is a timing chart in the process of step S55 in FIG. 13.

FIG. 14 is a timing chart in the process of step S55. In step S55, the control section 300 increases the rotation speed of the screw 40 to the second rotation speed, which is a rotation speed higher than the first rotation speed, which was the rotation speed before the ejection stopped period, and then returns the rotation speed to the first rotation speed, ending the first control. In this way, even in a case where the movement distance of the nozzle 61 in the same layer is a short distance and the ejection stopped period is short, it is possible to rapidly increase the internal pressure to an appropriate pressure. Note that the control section 300 may return the rotation speed from the second rotation speed to the first rotation speed not in the first control, but immediately after ejection is resumed after the end of the first control.

When it is determined in step S54 of FIG. 13 that the movement distance of the nozzle 61 is longer than the predetermined distance, the control section 300 executes the process of step S56.

Figure 15:
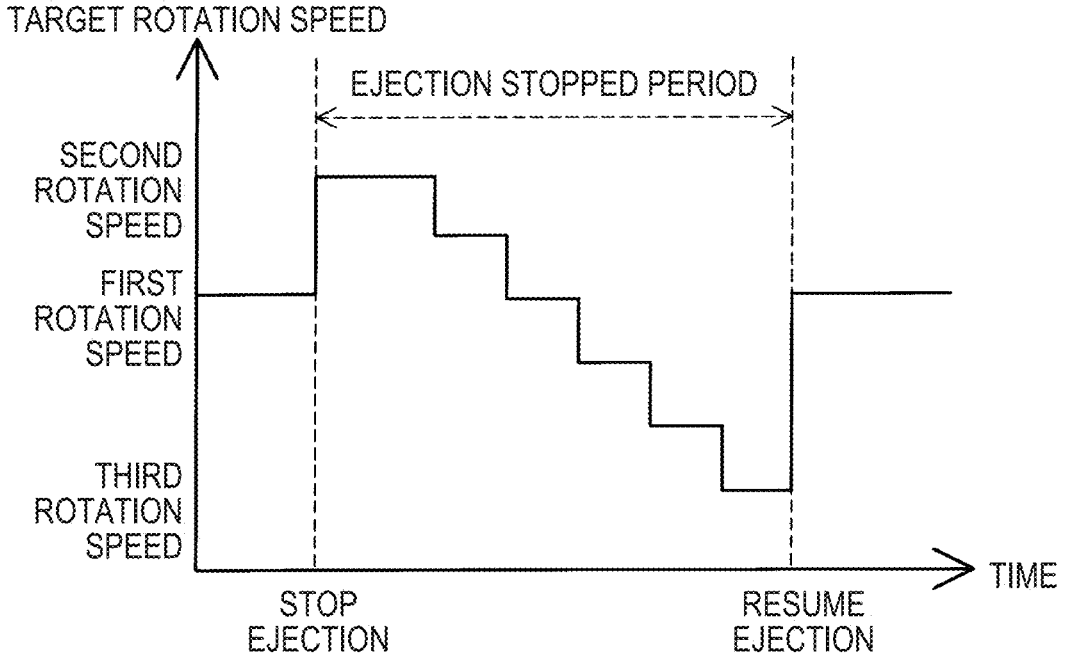
FIG. 15 is a timing chart in the process of step S56 in FIG. 13.

FIG. 15 is a timing chart in the process of step S56. In step S56, the control section 300 increases the rotation speed of the screw 40 to the second rotation speed, which is a rotation speed higher than the first rotation speed, which is the rotation speed before the ejection stopped period, and then gradually decreases the rotation speed to the third rotation speed, which is a rotation speed lower than the first rotation speed, ending the first control. In this way, the internal pressure can be brought close to the target internal pressure in a short time, and the time until the internal pressure is stabilized can be shortened. Note that as shown in FIG. 15, "gradually decrease" includes decreasing the rotation speed in multi-stages and decreasing the rotation speed gradually or linearly.

When it is determined in step S53 that the reason for stopping ejection is not the reason B or C, that is, when it is determined that the reason for stopping ejection is neither the movement of the nozzle 61 along the Z direction nor the movement of the nozzle 61 to a different position within the same layer, the control section 300 stops the screw 40 in step S57 and, after a certain period has elapsed, returns the rotation speed of the screw 40 to the first rotation speed, which was the rotation speed before the ejection stopped period. The case where the reason for stopping ejection is neither the movement of the nozzle 61 in the Z direction nor the movement of the nozzle 61 to a different position in the same layer is, for example, a case where the head section 110 to be used is switched or an urgent maintenance is performed on the head section 110 during the forming process. Note that in step S57, the control section 300 may decrease the rotation speed of the screw 40 instead of stopping the screw 40. The timing at which the rotation speed of the screw 40 is returned to the first rotation speed may be immediately before or at the time of resuming ejection.

According to the second embodiment described above, the control of the rotation speed of the screw 40 during the ejection stopped period is switched according to the reason for stopping ejection. Therefore, even when the ejection stopped period varies depending on the reason for stopping ejection, the internal pressure can be appropriately controlled.

Note that in the second embodiment, the control section 300 switches the control content according to the reason for stopping ejection. In contrast to this, the control section 300 may calculate the length of the ejection stopped period and switch the control content according to the length. For example, the control section 300 may execute the process of step S57 when the ejection stopped period is 5 minutes or more, execute the process of step S52 when the ejection stopped period is 10 seconds to 20 seconds, execute the process of step S56 when the ejection stopped period is 1 second to 10 seconds, and execute the process of step S55 when the ejection stopped period is less than 1 second.

In the second embodiment, as illustrated in FIG. 13, the control section 300 switches the control content to any one of the four control contents according to the reason for stopping ejection in the first control. In contrast to this, the control section 300 may execute any one of the processes of steps S55, S56, and S57 in the first control regardless of the reason for stopping ejection.

C. Third Embodiment

The configuration of the three dimensional molding system 10 in the third embodiment is the same as that in the first embodiment. In the third embodiment, the content of the first control executed by the control section 300 in the forming process is different from that in the first embodiment.

In the first control according to the third embodiment, the control section 300 changes the rotation speed of the screw 40 in multi-stages as shown in FIG. 7, and controls the second rotation speed in accordance with the positions of the plunger 67 when ejection is stopped, as described below.

Figure 16:
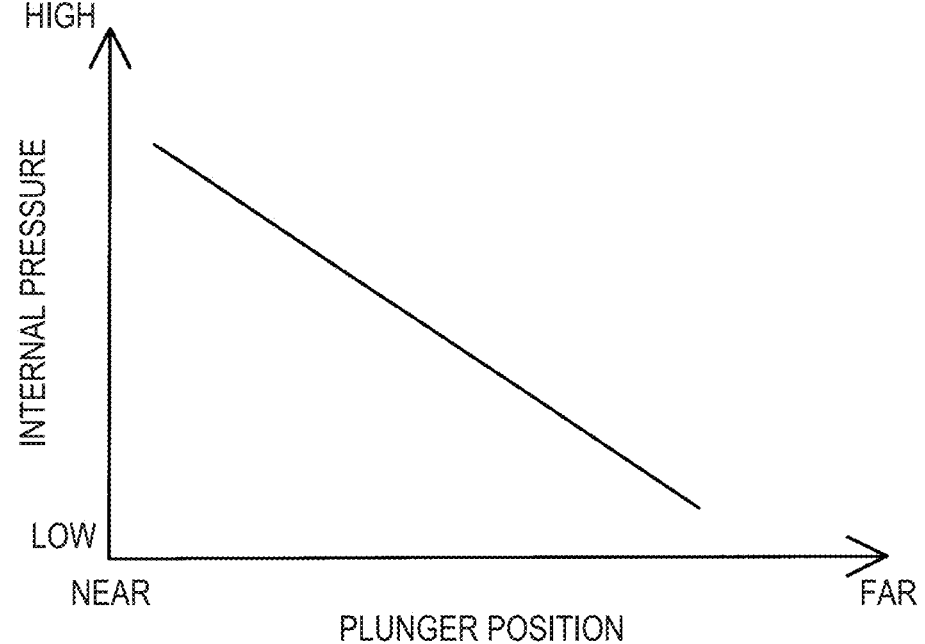
FIG. 16 is a graph showing a target value of the internal pressure according to the position of the plunger.

FIG. 16 is a graph showing the target value of the internal pressure according to the position of the plunger 67. The control section 300 controls the rotation speed of the screw 40 such that the farther the position of the plunger 67 is at the time when ejection was stopped is from the flow path 65, the lower the internal pressure during the ejection stopped period. In other words, the rotation speed of the screw 40 is controlled such that the closer the position of the plunger 67 is to the flow path 65, the greater the internal pressure will be. In other words, the rotation speed of the screw 40 is controlled such that the internal pressure at a first position of the plunger 67 is higher than that at a second position, which is farther from the flow path 65 than the first position. An example of the relationship between the rotation speed of the screw 40 and the internal pressure is shown in FIG. 10.

As described above, the position of the plunger 67 is dynamically changed by the control section 300 to make the ejection amount constant at the time of ejection resumption or immediately after ejection resumption. Therefore, the position of the plunger 67 at the time of stopping ejection is not determined to be constant, and may be varied. For example, when the plunger 67 is far from the flowpath 65, it is difficult to further pull the plunger 67. Therefore, when the internal pressure is increased, it is difficult to absorb the pressure at the time of resuming ejection. On the other hand, when the plunger 67 is close to the flow path 65, it is difficult to further push the plunger 67. Therefore, when the internal pressure decreases, it is difficult to compensate for the pressure at the time of resuming ejection. In the third embodiment described above, the rotation speed of the screw 40 during the ejection stopped period is controlled in accordance with the position of the plunger 67. More specifically, the rotation speed of the screw 40 is controlled such that the internal pressure decreases as the position of the plunger 67 at the time of stopping ejection is farther from the flow path 65. Therefore, according to the third embodiment, it is possible to suppress that the internal pressure becomes a pressure that hinders operation of the plunger 67 at the time of resuming ejection, and it becomes easier to keep the ejection amount constant at the time of resuming ejection.

D. Fourth Embodiment

The configuration of the three dimensional molding system 10 in the fourth embodiment is the same as that in the first embodiment. In the fourth embodiment, a part of the forming process executed by the control section 300 is different from that in the first embodiment.

Figure 17:
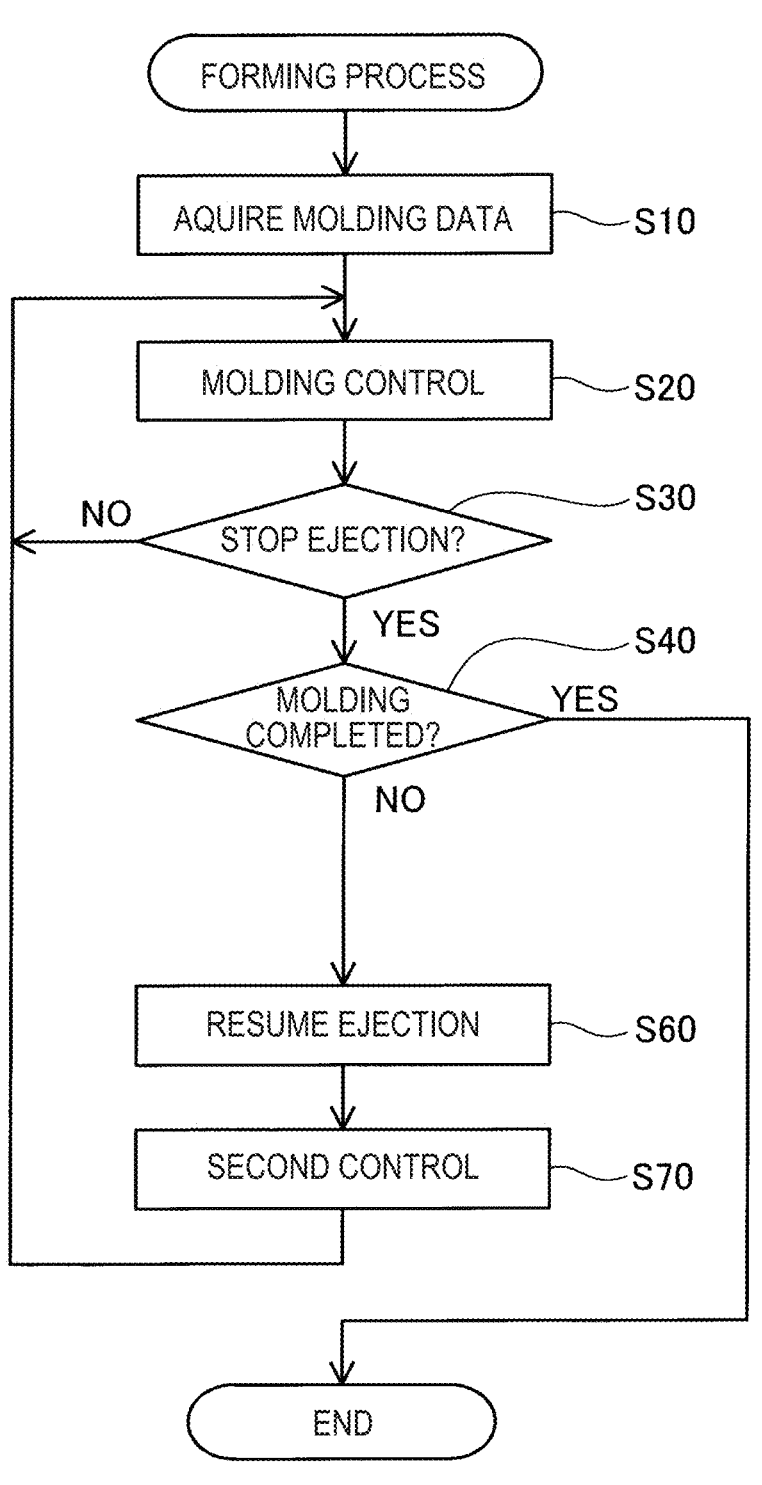
FIG. 17 is a flowchart of a forming process in the fourth embodiment.

FIG. 17 is a flowchart of a forming process executed by the control section 300 in the fourth embodiment. In the fourth embodiment, the first control is not executed, and the second control is executed in step S70 after ejection is resumed in step S60. Since other processing contents are the same as those of the first embodiment, the description other than the contents of the second control will be omitted below.

The second control is control for changing the rotation speed of the screw 40 in multi-stages in an resume ejection period which is a period until the opening degree of the flow path 65 reaches the opening degree designated to the ejection rate adjustment mechanism 70 after resuming ejection of the plasticized material from the nozzle opening 62.

Figure 18:
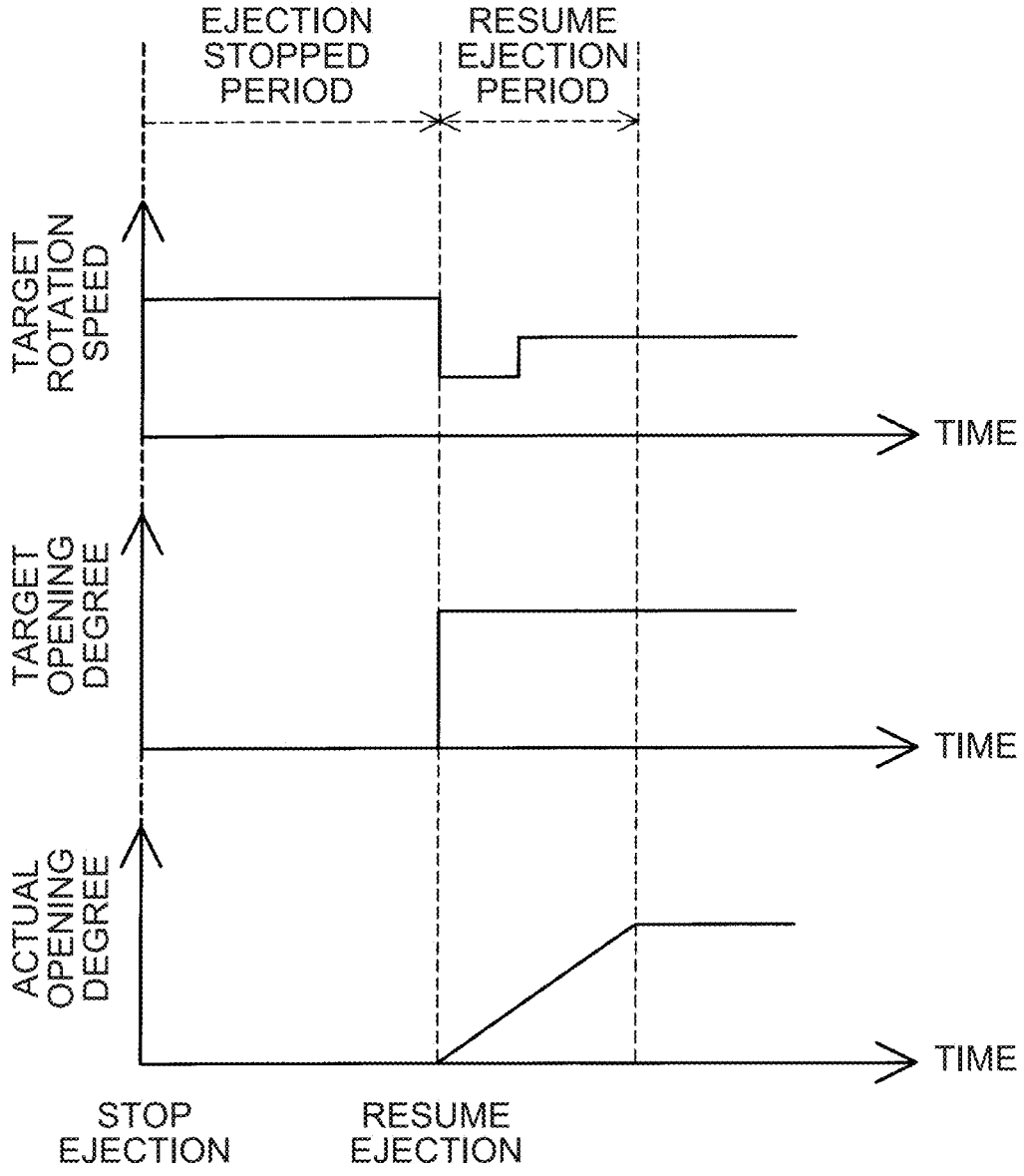
FIG. 18 is a timing chart showing processing contents of the second control.

FIG. 18 is a timing chart showing the processing contents of the second control in the fourth embodiment. FIG. 18 shows a timing chart of a signal indicating the target rotation speed of the screw 40 output from the control section 300 to the plasticization section 30, a signal indicating the target opening degree of the flow path 65 output from the control section 300 to the ejection rate adjustment mechanism 70, and the actual opening degree of the flow path 65. In the fourth embodiment, in the second control, the control section 300 increases the rotation speed of the screw 40 after decreasing the rotation speed during the resume ejection period. More specifically, in the resume ejection period, the control section 300 decreases the rotation speed of the screw 40 to be lower than the rotation speed during the ejection stopped period and then increases the rotation speed of the screw 40 to the normal rotation speed during the forming process.

According to the fourth embodiment described above, after ejection of the plasticized material from the nozzle opening 62 is resumed, the rotation speed of the screw 40 is decreased and then increased in the resume ejection period, which is the period until the opening degree of the flow path 65 reaches the opening degree designated for the ejection rate adjustment mechanism 70. Therefore, even when the internal pressure becomes excessive in the ejection stopped period, it is possible to suppress an increase in the ejection amount immediately after resuming ejection by decreasing the rotation speed of the screw 40 during the resume ejection period. Therefore, it is possible to stabilize the ejection amount immediately after ejection is resumed, and it becomes easy to make the line width constant.

E. Other Embodiments

E1. The control section 300 executes the first control in the forming process in the first to third embodiments and executes the second control in the fourth embodiment. In contrast, the control section 300 may execute both the first control and the second control.

E2. The control section 300 may repeat increase and decrease of the rotation speed of the screw 40 a plurality of times in the first control in each of the above-described embodiments. The control section 300 may change the number of repetitions of the increase and decrease in the rotation speed according to the length of the ejection stopped period.

E3. In each of the above-described embodiments, the plasticization section 30 may plasticize the material by rotating an inline screw.

F. Other Configurations

The present disclosure is not limited to the above described embodiments, and can be realized in various configurations without departing from the spirit thereof. For example, the technical features of the embodiments corresponding to the technical features in each aspect described below can be appropriately replaced or combined in order to solve a part or all of the problems described above or to achieve a part or all of the effects described above. Unless the technical features are described as essential in the present specification, they can be appropriately deleted.

1. According to a second aspect of the present disclosure, the three dimensional molding device is provided. The three dimensional molding device includes a plasticization section that includes a screw and a motor configured to rotate the screw and that plasticizes a material to generate a plasticized material; a nozzle that has nozzle opening and that ejects the plasticized material; an ejection rate adjustment mechanism provided in a flow path through which the plasticized material flows and that communicates with the nozzle opening, the ejection rate adjustment mechanism controlling the ejection rate of the plasticized material from the nozzle opening by adjusting an opening degree of the flow path; and a control section configured to control the plasticization section and the ejection rate adjustment mechanism, wherein the control section executes at least one of a first control for changing the rotation speed of the screw in multi-stages during an ejection stopped period, which is a period after ejection of the plasticized material from the nozzle opening is stopped and before ejection of the plasticized material from the nozzle opening is resumed, and a second control for changing the rotation speed of the screw in multi-stages during a resume ejection period, which is a period after ejection of the plasticized material from the nozzle opening is resumed and before the opening degree of the flow path reaches an opening degree designated for the ejection rate adjustment mechanism and in the second control, the control section decreases and then increases the rotation speed of the screw.

According to such an aspect, by changing the rotation speed of the screw in multi-stages in the ejection stopped period or the resume ejection period, it is possible to stabilize the amount of ejection of the plasticized material when ejection is resumed or immediately after ejection is resumed.

2. In the aspect, in the first control, the control section may increase the rotation speed of the screw to the second rotation speed, which is a rotation speed higher than the first rotation speed in the period before the ejection stopped period, and then decreases the rotation speed of the screw to the third rotation speed, which is a rotation speed lower than the first rotation speed. According to this aspect, it is possible to stabilize the ejection amount of the plasticized material when ejection resumes.

3. In the aspect, in the first control, the control section gradually decreases the rotation speed of the screw when decreasing the rotation speed of the screw is decreased from the second rotation speed to the third rotation speed in the first control. According to this aspect, during the ejection stopped period, it is possible to shorten the time until the pressure in the flow path upstream of the ejection rate adjustment mechanism is stabilized.

4. In the aspect, in the first control, the control section may return the rotation speed of the screw to the first rotation speed after increasing the rotation speed of the screw to the second rotation speed, which is a rotation speed higher than the first rotation speed in the period before the ejection stopped period. According to this aspect, even in a case where the ejection stopped period is short, it is possible to rapidly increase the pressure in the flow path upstream of the ejection rate adjustment mechanism to an appropriate pressure.

5. In this aspect, a suction mechanism including a branch path coupled to the flow path and a suction mechanism including a plunger located in the branch path that is capable of sucking the plasticized material in the flow path into the branch path by changing the position of the plunger may be provided, wherein the control section may control the rotation speed of the screw in accordance with the position of the plunger in the branch path in the first control. According to this configuration, it is possible to suppress the pressure in the flow path upstream of the ejection rate adjustment mechanism from becoming a pressure that inhibits the operation of the plunger at the time of resuming the ejection.

The present disclosure is not limited to the above-described three dimensional molding device, and can be realized by various aspects such as a three dimensional molding system, a method of manufacturing a three dimensional molded object, a computer program, and a non-transitory tangible recording medium in which a computer program is recorded in a computer-readable manner.

What is claimed is:

1. A three dimensional molding device comprising:

a plasticization section that includes a screw and a motor configured to rotate the screw and that plasticizes a material to generate a plasticized material;

a nozzle that has nozzle opening and that ejects the plasticized material;

an ejection rate adjustment mechanism provided in a flow path through which the plasticized material flows and that communicates with the nozzle opening, the ejection rate adjustment mechanism comprising a valve and configured to control the ejection rate of the plasticized material from the nozzle opening by adjusting an opening degree of the flow path; and a control section configured to control the plasticization section and the ejection rate adjustment mechanism, wherein the control section configured to execute a first control for changing the rotation speed of the screw in multi-stages during an ejection stopped period, which is a period after ejection of the plasticized material from the nozzle opening is stopped and before ejection of the plasticized material from the nozzle opening is resumed, or a second control for changing the rotation speed of the screw in multi-stages during a resume ejection period, which is a period after ejection of the plasticized material from the nozzle opening is resumed and before the opening degree of the flow path reaches an opening degree designated for the ejection rate adjustment mechanism and in the first control, the control section increases the rotation speed of the screw to a second rotation speed, which is a rotation speed higher than a first rotation speed of the period before the ejection stopped period, and in the second control, the control section decreases and then increases the rotation speed of the screw.

2. The three dimensional molding device molding device according to claim 1, wherein in the first control, the control section increases the rotation speed of the screw to a second rotation speed, which is a rotation speed higher than a first rotation speed of the period before the ejection stopped period, and then decreases the rotation speed of the screw to a third rotation speed, which is a rotation speed lower than the first rotation speed.

3. The three dimensional molding device according to claim 2, wherein the control section gradually decreases the rotation speed of the screw when decreasing the rotation speed of the screw from the second rotation speed to the third rotation speed in the first control.

4. The three dimensional molding device according to claim 1, wherein in the first control, the control section returns the rotation speed of the screw to the first rotation speed after increasing the rotation speed of the screw to the second rotation speed, which is a rotation speed higher than the first rotation speed in the period before the ejection stopped period.

5. The three dimensional molding device according to claim 1, further comprising:

a suction mechanism including a branch path coupled to the flow path and a plunger located in the branch path and configured to suck the plasticized material in the flow path into the branch path by changing the position of the plunger, wherein in the first control, the control section controls the rotation speed of the screw in accordance with the position of the plunger in the branch path.

* * * * *